(12) United States Patent
Lin et al.

(10) Patent No.: US 7,061,435 B2
(45) Date of Patent: Jun. 13, 2006

(54) MONOPOLE ANTENNA ASSEMBLY

(75) Inventors: Hsien-Chu Lin, Tu-Chen (TW);
Lung-Sheng Tai, Tu-Chen (TW);
Chia-Ming Kuo, Tu-chen (TW);
Zhen-Da Hung, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/844,772

(22) Filed: May 12, 2004

(65) Prior Publication Data

US 2004/0233121 A1 Nov. 25, 2004

Related U.S. Application Data

(63) Continuation-in-part of application No. 10/841,380, filed on May 7, 2004.

(30) Foreign Application Priority Data

May 9, 2003 (TW) .............................. 92208564 U

(51) Int. Cl.
*H01Q 1/24* (2006.01)

(52) U.S. Cl. ......................... 343/702; 343/892; 343/906
(58) Field of Classification Search ......... 343/700 MS, 343/702, 892, 906
See application file for complete search history.

(56) References Cited

U.S. PATENT DOCUMENTS 6,473,043 B1 * 10/2002 Hwang ....................... 343/702
6,486,834 B1 * 11/2002 Tsai ............................ 343/702

* cited by examiner

*Primary Examiner*—Shih-Chao Chen
(74) *Attorney, Agent, or Firm*—Wei Te Chung

(57) ABSTRACT

A monopole antenna assembly mounted on a bracket (3) of an electronic device includes an electronic connector (1), a printed monopole antenna (2) mechanically and electrically connecting with a contact (12) of the electronic connector. The electronic connector is a male connector for complementarily engaging with a female connector of a feeder cable assembly of the electronic device. The electronic connector further comprises at least one mounting leg (104) cooperating with the contact for firmly retaining the printed monopole antenna.

12 Claims, 10 Drawing Sheets

Socale: 5dBi/div
Operating Frequency: 2.5GHz
Horizontally polarized in X-Y plane Socale: 5dBi/div
Operating Frequency: 2.5GHz
Vertically polarized in X-Y plane Scale: 5dBi/div
Operating Frequency: 2.5GHz
Horizontally polarized in Y-Z plane

MONOPOLE ANTENNA ASSEMBLY

CROSS-REFERENCE TO RELATED APPLICATION

The present application is a continuation-in-part application of a copending application Ser. No. 10/841,380 entitled "MONOPOLE ANTENNA ASSEMBLY" filed May 7, 2004, having an unknown serial number, the same inventors and the same assignee.

BACKGROUND OF THE INVENTION

1. Field of the Invention

The present invention relates to an antenna assembly, and in particular to a monopole antenna assembly employed in an electronic device.

2. Description of the Prior Art or Related Art

Today some products applied in Wireless Local Area Network (WLAN), such as WLAN Cards for desktop or laptop computer and WLAN Access Points (APs) under IEEE802.11 a/b standards have been introduced into the market. These communication devices benefit from external antennas or internal antennas. In order to fully utilize the space of the laptop computer, the internal antenna is mostly adopted to be assembled into a hinge or a backplane of a liquid crystal display of the laptop computer. But for the desktop computer, the efficient of utilizing space is not very important. So a simple antenna assembly with a perfect radiating pattern is especially important.

U.S. Pat. No. 6,268,836 has disclosed an antenna assembly for a handle electronic device. This antenna assembly comprises a mast, a film, a radiating antenna element disposed on the film, an electrical plug having a contact extending outwardly, a feed line for connecting the contact with the radiating antenna element. The antenna assembly makes an electrical connection with the electronic device when the electrical plug is complementarily connected into an electrical socket of the electrical device. However this antenna assembly has a complex mechanical structure resulting in higher manufacture cost.

Monopole antenna assemblies have been adopted for their simple structures. For example, U.S. Pat. No. 6,486,834 discloses an antenna assembly comprising printed meander monopole antenna disposed on a dielectric substrate as an internal antenna for a laptop computer. The dielectric substrate comprises a mounting hole for engaging with a screw to mount the antenna assembly into the laptop computer. However this monopole antenna assembly is not suitable for an external mounting.

Hence, an improved antenna assembly is desired to overcome the above-mentioned disadvantages of the prior and related arts.

BRIEF SUMMARY OF THE INVENTION

A primary object of the present invention is to provide a monopole antenna assembly with simple structure for an electronic device.

A monopole antenna assembly in accordance with the present invention mounted onto a bracket of an electronic device comprises an electronic connector having a contact extending outwardly and a monopole antenna having a radiating trace electrically connected with the contact.

The antenna assembly connects to the electronic device via a cable assembly. The electronic connector is a male connector. The cable assembly comprises a feeder cable and a female connector connecting to an end of the cable. The male connector complementarily engages with the female connector. Thus this antenna assembly is easy to be made and assembled by engaging or separating between the male and female connectors.

Other objects, advantages and novel features of the invention will become more apparent from the following detailed description of a preferred embodiment when taken in conjunction with the accompanying drawings.

DETAILED DESCRIPTION OF THE INVENTION

Reference will now be made in detail to a preferred embodiment of the present invention.

Figure 1A:
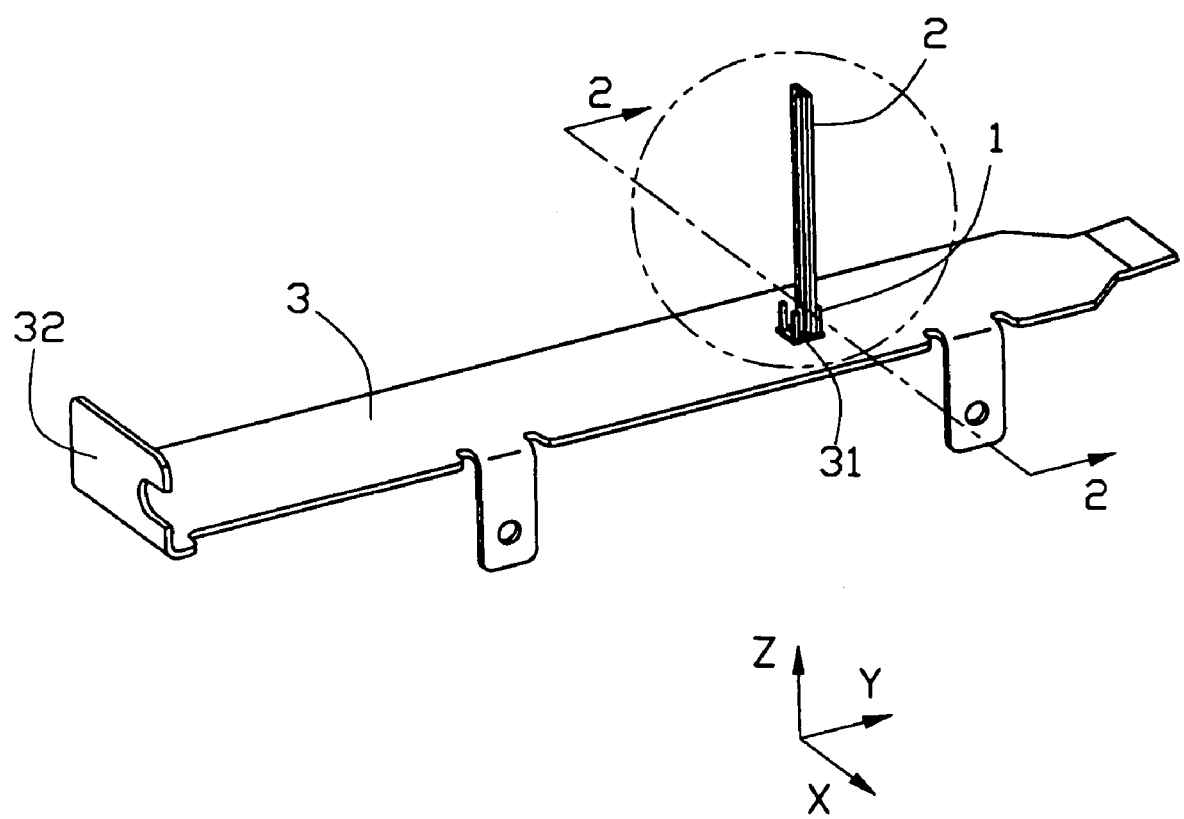
FIG. 1A is a perspective view of a preferred embodiment of a monopole antenna assembly in accordance with the present invention mounted on a bracket of an electronic device.

Referring to FIG. 1A, a monopole antenna assembly assembled on a bracket 3 of an electronic device such as a desktop computer (not shown) comprises an electronic connector 1 and a printed monopole antenna 2.

Figure 1B:
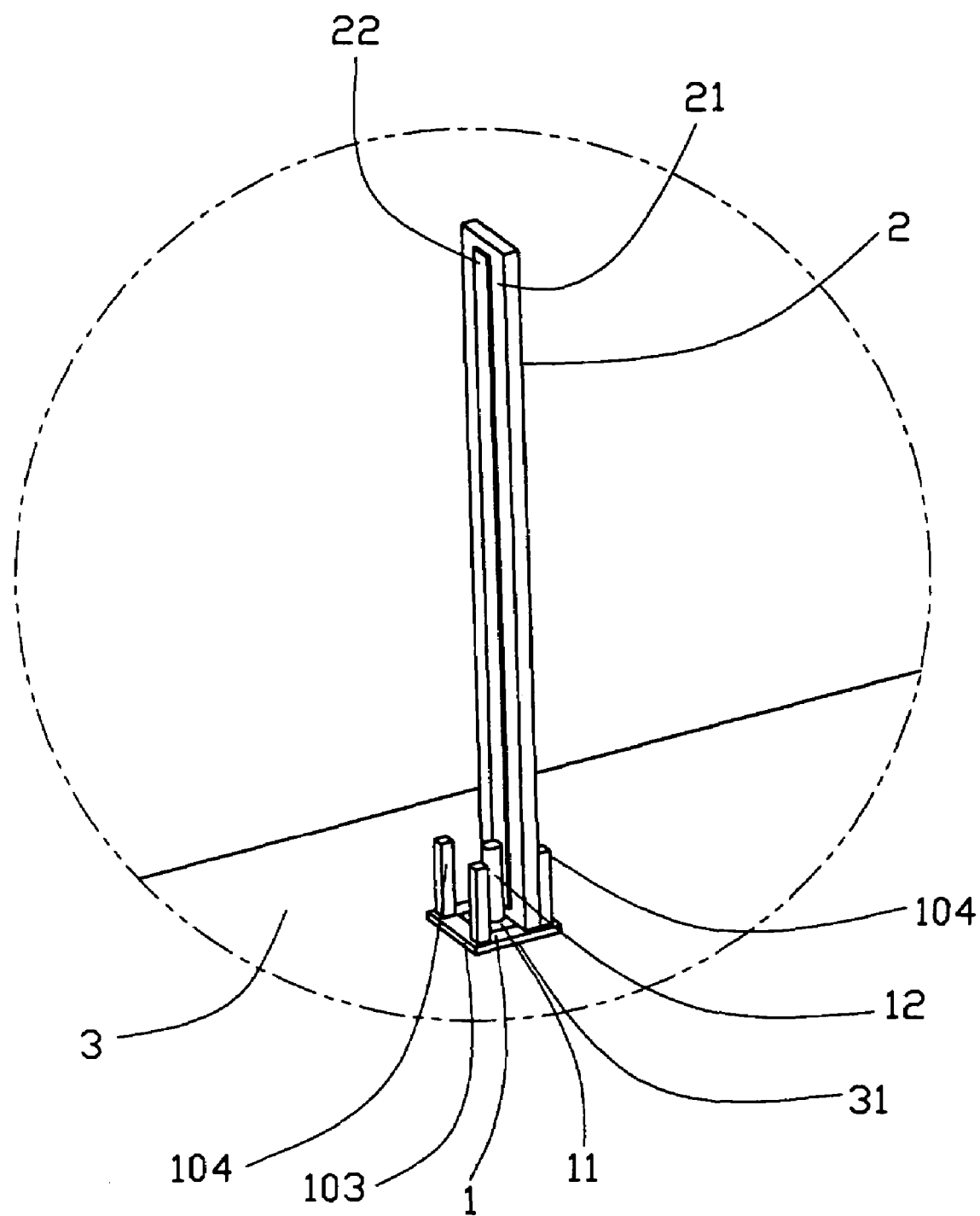
FIG. 1B is an enlarged view of the monopole antenna assembly of FIG. 1A.
Figure 2:
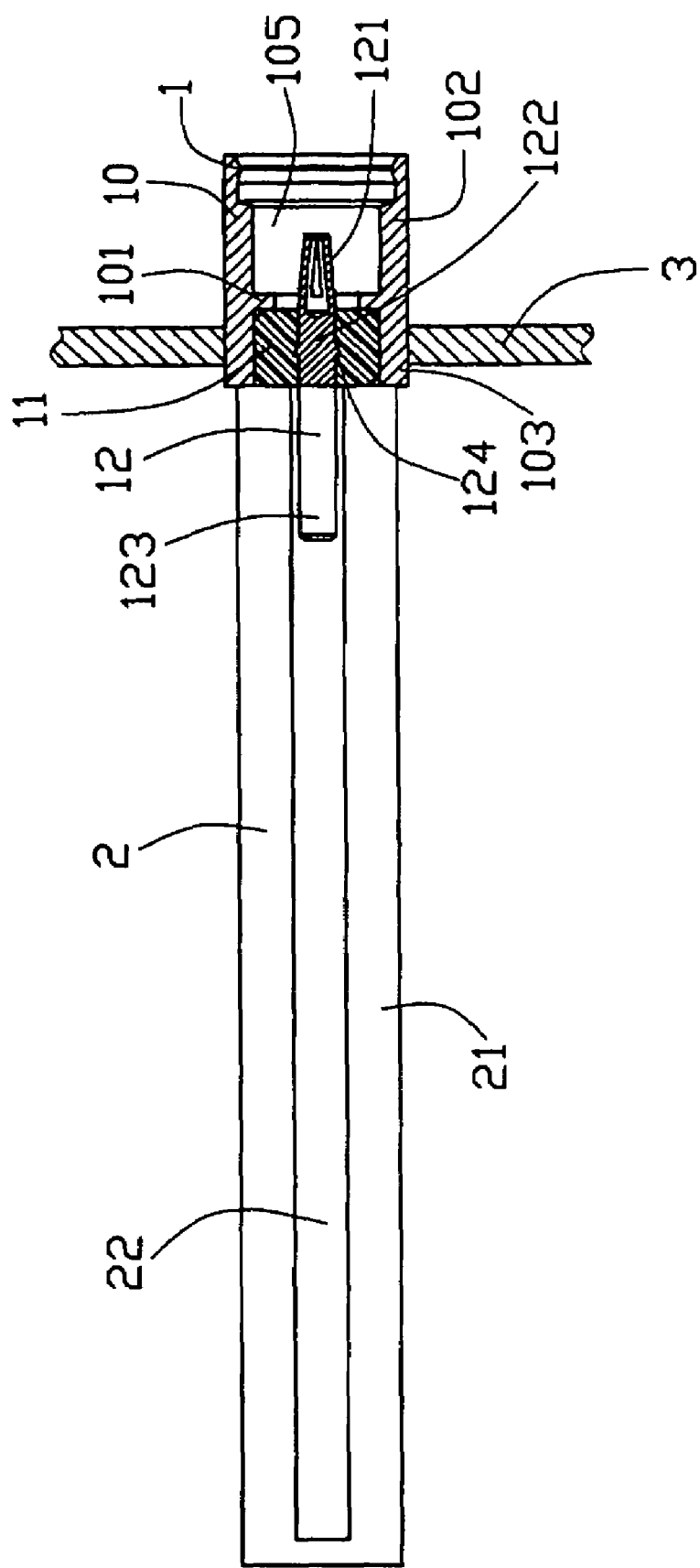
FIG. 2 is a cross-sectional view of an electronic connector of the monopole antenna assembly of FIG. 1A along line 2—2 of FIG. 1A.

Referring to FIG. 1B and FIG. 2, the electronic connector 1 comprises a metal shield 10 divided into an upper portion 103 and a lower portion 102 by a baffle 101, a dielectric housing 11 received in the upper portion 103, a receiving room 105 defined in the lower portion 102 and a contact 12 getting through the receiving room 105. Four mounting legs 104 are parallel to the contact 12 and respectively set on four corners of a top surface of the upper portion 103. The contact 12 comprises an insert end 121 for complementarily engaging with another electronic connector (not show) of the electronic device, a retaining part 122 surrounded by the dielectric housing 11 and a connecting portion 123 for connecting with the printed monopole antenna. A pair of barbs 124 protrude from the surface of the retaining portion 122 and are fully inserted into the dielectric housing 11.

The printed monopole antenna 2 comprises an elongate dielectric substrate 21 and a straight printed radiating trace 22 disposed on the substrate 21. In this embodiment, the length of the radiating trace is 27 mm for operating at 2.4 GHZ frequency band. When the monopole antenna 2 is mounted onto the electronic connector 1, the connecting portion 123 of the electronic connector 1 is soldered onto an end of the radiating trace 22. Each two adjacent mounting legs 104 in one side can be selected to engage on a first surface of the substrate 21. The contact 12 engages on a second surface of the substrate 21. Thus the substrate 21 is clamped by the mounting legs 104 and the contact 12.

The bracket 3 is a metal sheet mounted on a panel of the electronic device (such as a desktop computer). The bracket 3 comprises a hole 31 and a mounting portion 32 for mounting the bracket 3 onto the electronic device. The mounted monopole antenna assembly gets through the hole 31 with part of the electronic connector 1 below a bottom surface of the bracket 3 and the printed monopole antenna 2 on a top surface of the bracket 3. The shield 10 of the electronic connector 1 is soldered to the bracket 3.

The printed monopole antenna 2 is perpendicular to the bracket 3 to achieve a best radiating pattern. The shield 10 is soldered onto the bracket 3 to obtain a larger grounding area for the monopole antenna 2. In this embodiment the electronic connector 1 is a male connector for engaging a female connector (not shown) of a feeder cable assembly (not shown). The feeder cable has a signal line making electrical connection with radiating trace through the contacts of the male and female connectors. The feeder cable also has a ground line founding an electrical connection path between the shields of the male and female connectors and the bracket 3.

In assembling, this monopole antenna assembly utilizes the electronic connector 1 as a plug for complementarily engaging or separating with the cable assembly of the electronic device. This monopole antenna assembly is especially suitable to be an external antenna assembly for the electronic device.

Figure 3:
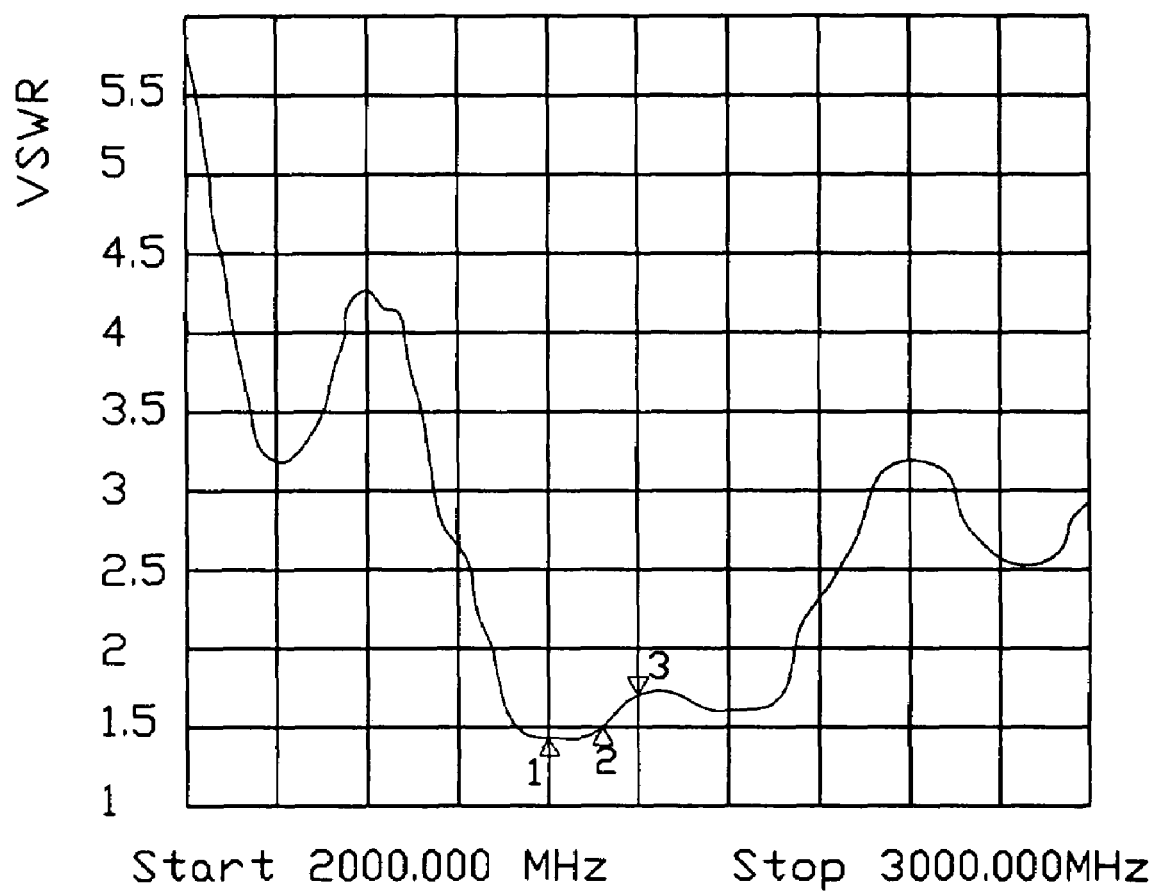
FIG. 3 is test chart recording for the monopole antenna assembly of FIG. 1A, showing Voltage Standing Wave Ratio (VSWR) as a function of frequency.
Figure 4:
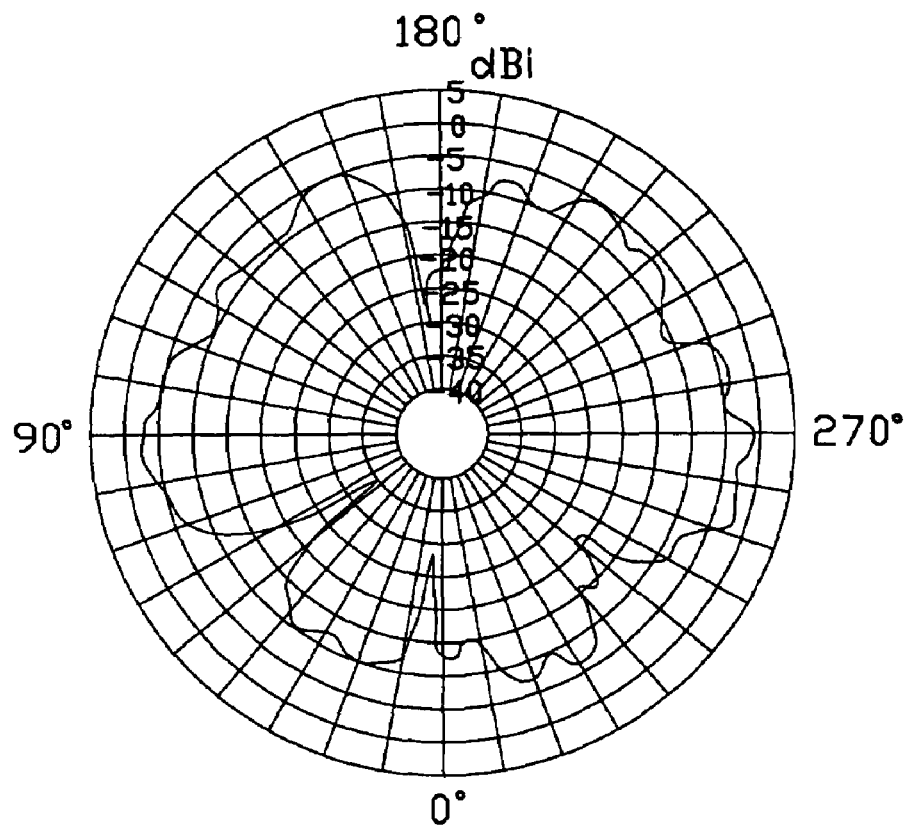
FIG. 4 is a recording of a horizontally polarized principle plane radiation pattern in X-Y plane of the monopole antenna assembly of FIG. 1A operating at a frequency of 2.5 GHz.
Figure 5:
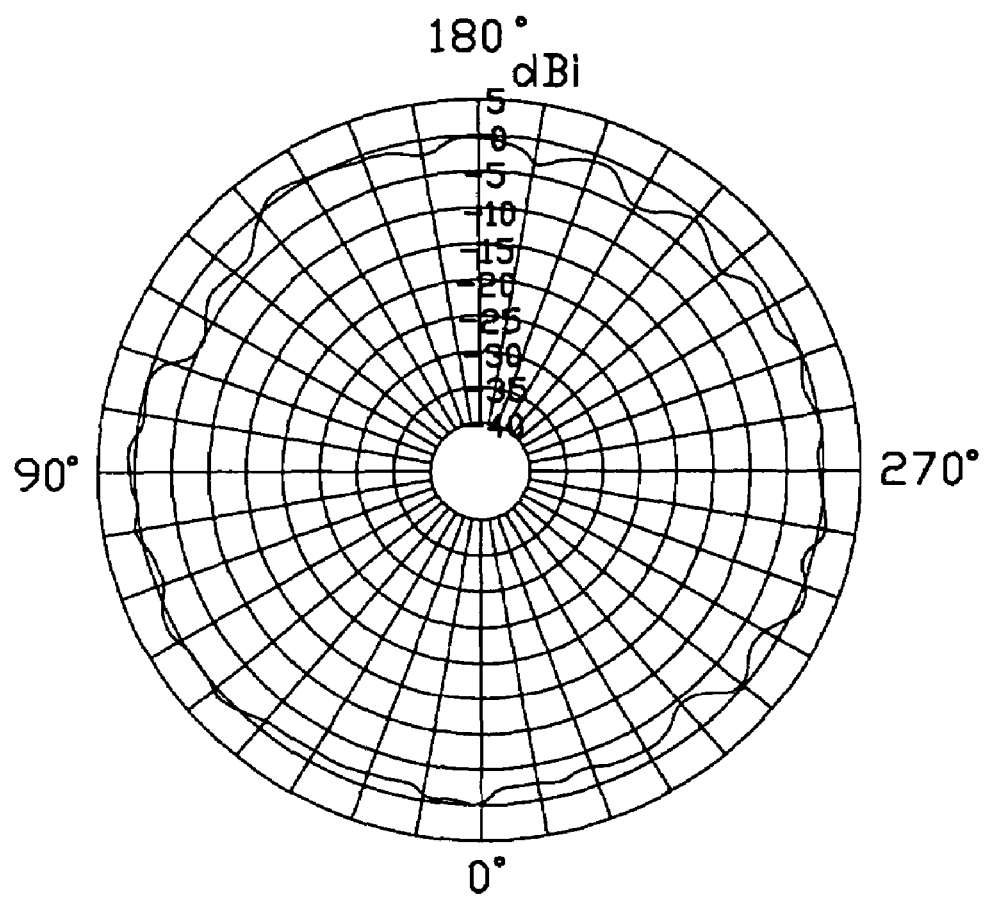
FIG. 5 is a recording of a vertically polarized principle plane radiation pattern in X-Y plane of the monopole antenna assembly of FIG. 1A operating at a frequency of 2.5 GHz.
Figure 6:
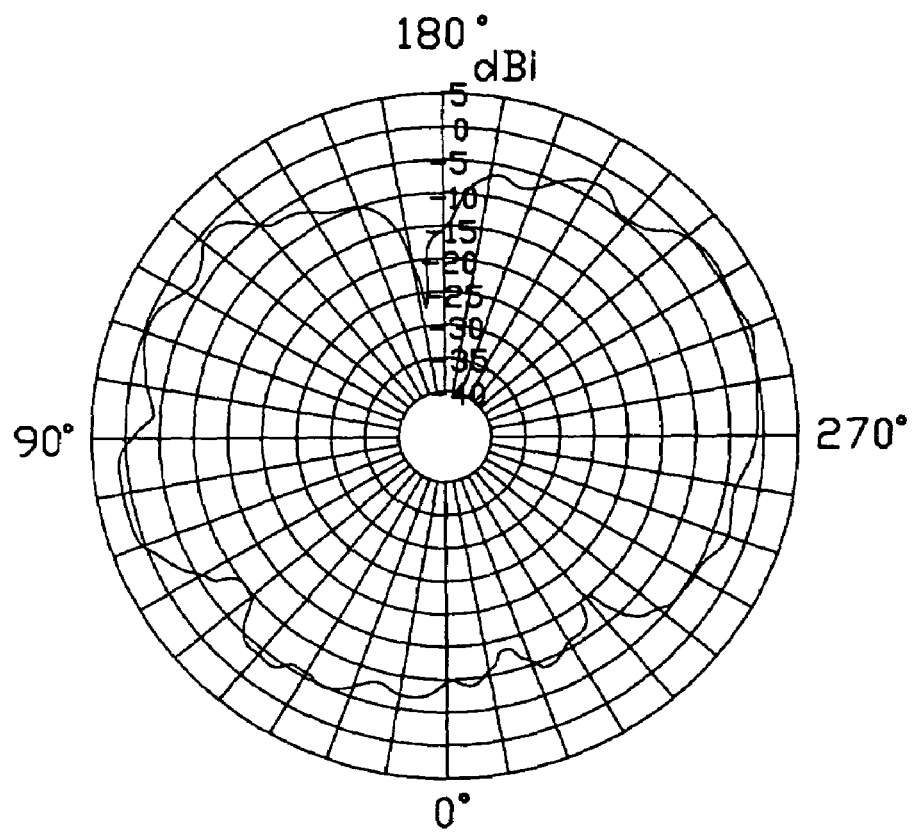
FIG. 6 is a recording of a horizontally polarized principle plane radiation pattern in Y-Z plane of the monopole antenna assembly of FIG. 1A operating at a frequency of 2.5 GHz.
Figure 7:
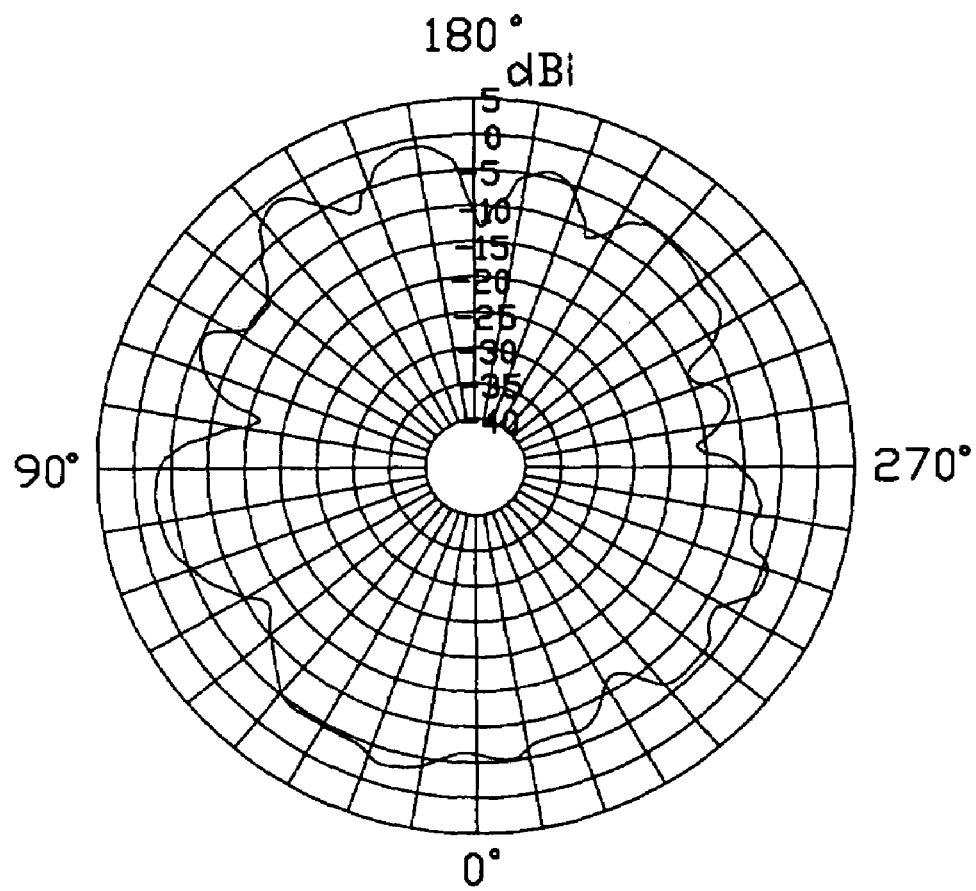
FIG. 7 is a recording of a vertically polarized principle plane radiation pattern in Y-Z plane of the monopole antenna assembly of FIG. 1A operating at a frequency of 2.5 GHz.

FIG. 3 shows a test chart recording of Voltage Standing Wave Ratio (VSWR) of the monopole antenna assembly as a function of frequency. Note that VSWR drops below the desirable maximum value "2" in the 2.4–2.5 GHz frequency band, indicating acceptably efficient operation in the frequency band.

FIGS. 4–7 show horizontally and vertically polarized principle plane radiation patterns of the monopole antenna assembly operating at frequencies of 2.5 GHz. Note that each radiation pattern is close to a corresponding optimal radiation pattern and there is no obvious radiating blind area.

Figure 8:
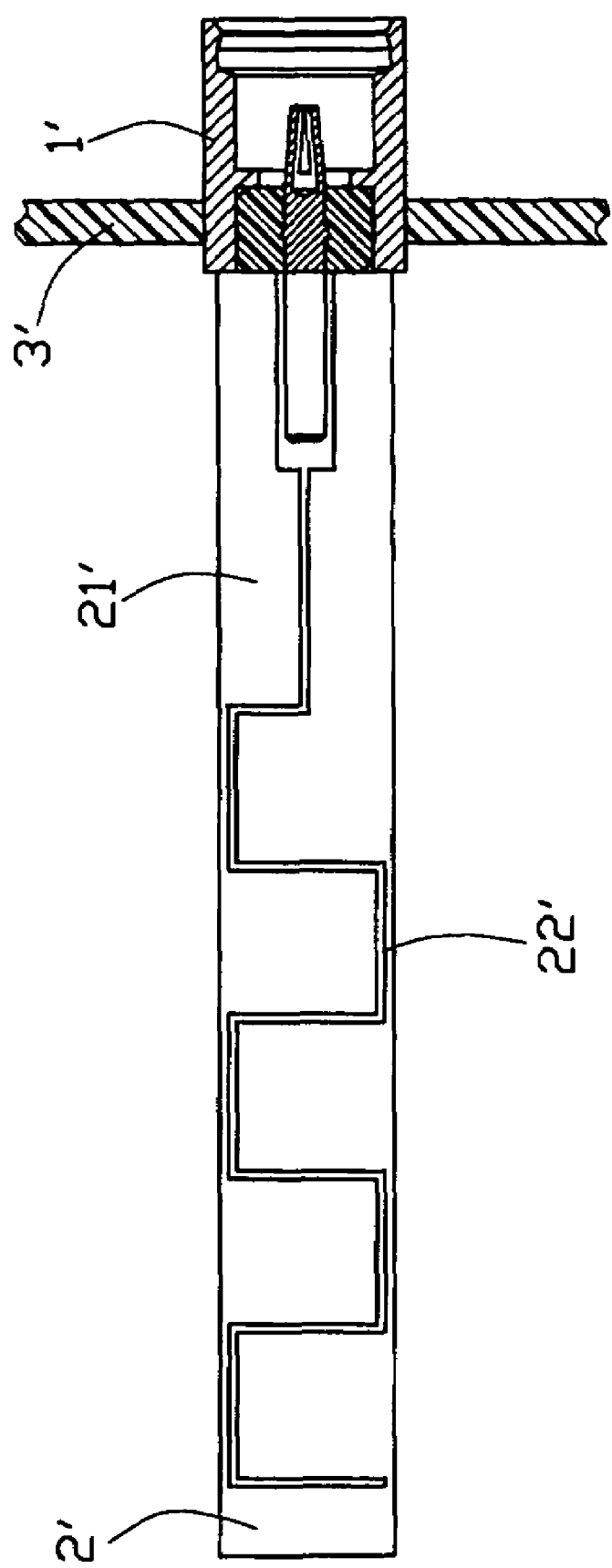
FIG. 8 is a cross-sectional view of an another embodiment in accordance with the present invention.

In another embodiment, FIG. 8, the radiating trace 21 of the monopole antenna assembly is a meander radiating trace which is a rectangular-wave shape. The other elements are same with the first embodiment.

Figure 9:
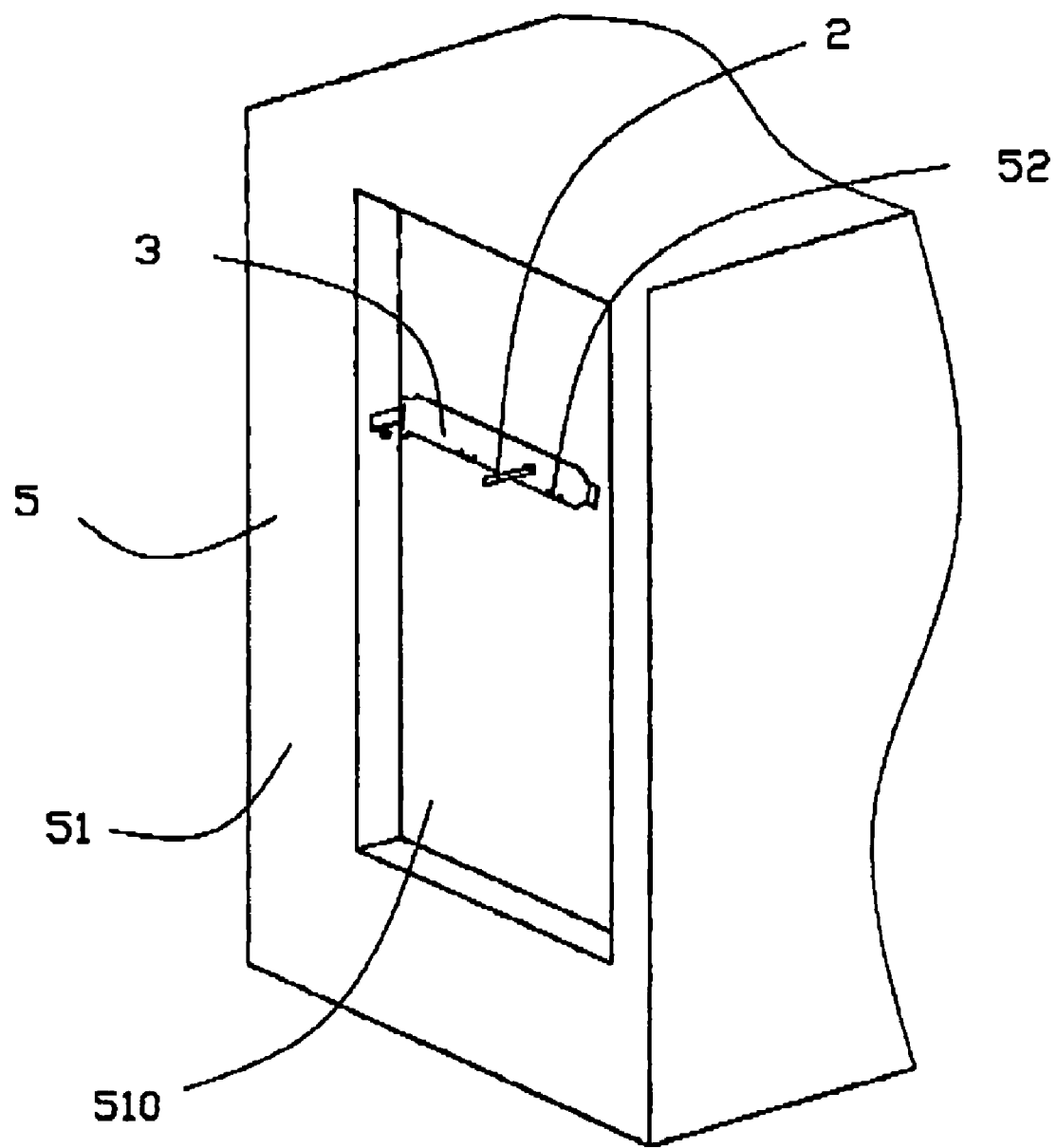
FIG. 9 shows a monopole antenna assembly of the first embodiment in accordance with the present invention assembled in a desktop computer.

In assembly, further referring to FIG. 9, the monopole antenna assembly of the first embodiment in accordance with the present invention is mounted in an expansion slot 52 in a back panel 51 of a desktop computer 5 by fixing the bracket 3 to the back panel 51. The bracket 3 and the printed monopole antenna 2 is exposed to an exterior side 510 of the computer 5 or the bracket 3, so the communication of the printed monopole antenna 2 is not affected by the back panel 51. The connecting portion 123 of the contact 12 is exposed to the exterior side 510 of the computer 5 or the bracket 3 for connecting with the printed monopole antenna 2, and the insert end 121 of the contact 12 faces an interior of the computer 15 for mating with the complementary electrical connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the printed circuit board may be arranged in a parallel relation with the bracket instead of the perpendicular relation.

What is claimed is:

1. An antenna assembly mounted on a bracket of an electronic device, comprising:
   an electronic connector mounted on the bracket, the connector comprising a shield, a dielectric housing surrounded by the shield and a contact fixed in the housing, the contact having a first end extending outwardly and a second end opposite to the first end; and
   an antenna element mechanically and electronically connected with the first end of the contact; wherein
   the shield of the electronic connector is adapted for being electrically connected with the bracket; wherein
   the antenna element comprises a dielectric substrate and a printed monopole antenna disposed thereon, wherein
   the electronic connector comprises two mounting legs cooperating with the contact for retaining the antenna element; wherein
   the two mounting legs engage on a first surface of the substrate and the contact engages on a second surface of the substrate.

2. The antenna assembly as claimed in claim 1, wherein a part of the connector is below a bottom surface of the bracket and another part of the connector and the monopole antenna are above a top surface of the bracket.

3. The antenna assembly as claimed in claim 2, wherein the electronic connector comprises a receiving room in which the second end of the contact extending.

4. The monopole antenna assembly as claimed in claim 1, wherein the printed monopole antenna is a printed meander monopole antenna which is in a rectangular-wave shape.

5. An antenna assembly comprising:
   a metallic bracket;
   an electrical connector mounted to said bracket, said connector including an insulative housing surrounded by a metallic shield defining a mating port facing an interior of the bracket, a contact retained in the housing and having an inner end extending into the mating port and an outer end extending outwardly and exposed to an exterior of the bracket; and
   a printed circuit board mounted on an exterior side of the bracket adjacent to the connector, said printed circuit board having radiating traces thereon and connected to the outer end of the contact.

6. The assembly as claimed in claim 5, wherein the printed circuit board is retained within a periphery of said connector.

7. The assembly as claimed in claim 5, wherein said printed circuit board is perpendicular to the bracket.

8. The antenna assembly as claimed in claim 5, wherein the shield directly engages the bracket.

9. An antenna assembly comprising:
   a metallic bracket;
   an electrical connector mounted to said bracket, said connector including an insulative housing surrounded by a metallic shield defining a mating port facing an interior of the bracket, a contact retained in the housing and having a first end extending into the mating port, and a second end opposite to said first end; and an additional radiating device mounted on an exterior side of the bracket adjacent to the connector, and mechanically and electrically connected to the second end of the contact.

10. The antenna assembly as claimed in claim 9, wherein said radiating device is a printed circuit board.

11. The antenna assembly as claimed in claim 9, wherein said second end is exposed outside in the bracket.

12. The antenna assembly as claimed in claim 9, wherein said shield directly engages the bracket.

\* \* \* \* \*